United States Patent [19]

Robillard

[11] 4,091,375
[45] May 23, 1978

[54] FLAT SCREEN SOLID STATE DISPLAY AND MEMORY DEVICE UTILIZING COLOR CENTERS

[75] Inventor: Jean Jules Robillard, Ferney Voltaire, France

[73] Assignee: Laboratoires de Physicochimie Appliquee, ISSEC S.A., Ferney Voltaire, France

[21] Appl. No.: 716,460

[22] Filed: Aug. 23, 1976

[51] Int. Cl.² ............................................. G06F 3/14
[52] U.S. Cl. ..................... 340/324 R; 340/166 EL; 350/333; 357/42; 340/336; 365/119
[58] Field of Search ........... 340/324 R, 324 M, 168 S, 340/173 CC, 166 EL, 336; 357/42, 44, 45; 350/160 R, 161 W

[56] References Cited

U.S. PATENT DOCUMENTS

| | | | |
|---|---|---|---|
| 3,720,926 | 3/1973 | Schneider | 340/173 CC |
| 3,771,150 | 11/1973 | Schneider | 340/173 CC |
| 3,792,465 | 2/1974 | Collins et al. | 340/168 S |
| 3,962,714 | 6/1976 | King | 350/160 R |

*Primary Examiner*—Marshall M. Curtis
*Attorney, Agent, or Firm*—Sherman & Shalloway

[57] ABSTRACT

A passive display device providing high resolution and contrast and very fast response time for presenting and erasing information is formed from a thin layer of a crystal material capable of forming color centers in an electric field, an electron injection source by tunnel effect which includes a first thin metal layer, an insulation barrier, and a very thin metal layer, and an electrode array for selectively controlling the path of the electrons passing through the very thin metal layer, by tunnel effect, into the crystal material, upon application of a suitable voltage across the metal layers, in accordance with the information to be displayed.

A process for displaying information using the passive display device requires applying a voltage across the metal layers of the electron injection source to create an electron flow, by tunnel effect, across the conduction band of the insulator and beyond the very thin metal layer to the crystal color center material, and simultaneously providing a voltage between the electrode array on the opposed surface of the crystal material and the very thin metal layer, the latter voltage causing acceleration of the electrons toward selective sites forming color centers in the crystal material in accordance with the information to be displayed.

17 Claims, 11 Drawing Figures

ENERGY LEVEL DIAGRAM

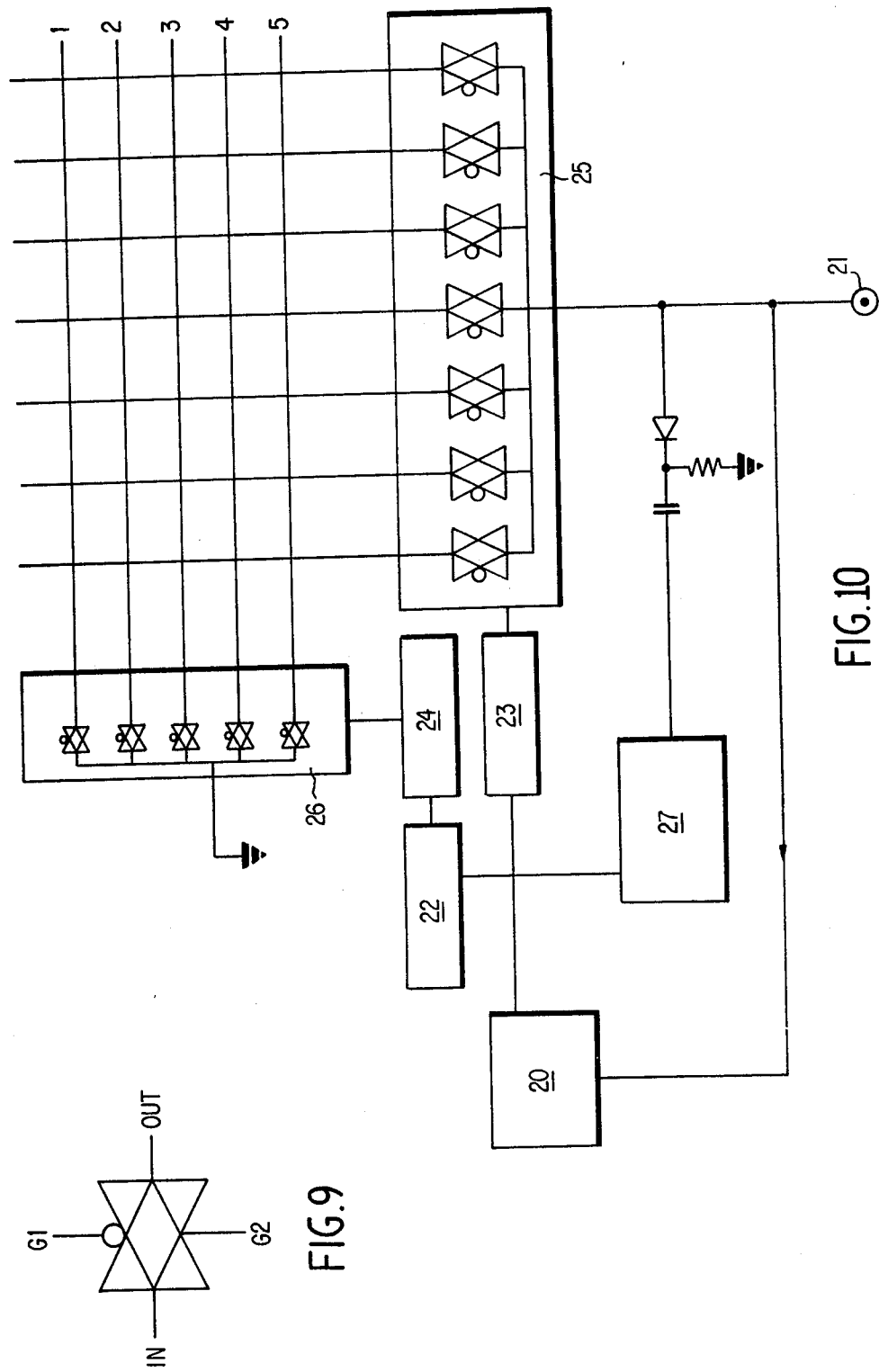

FLAT SCREEN SOLID STATE DISPLAY AND MEMORY DEVICE UTILIZING COLOR CENTERS

BACKGROUND OF THE INVENTION

1. Field of the Invention

The present invention relates to a new solid state system of displaying information on a flat screen. More particularly, it concerns a passive system of presentation of information where the display of information is effected by the modulation of the reflection of visible light on a white surface. This modulation is effected by the creation and the selective suppression of centers of absorption called "color centers", in the midst of a colorless material, under the local influence of an electric field.

2. Discussion of the Prior Art

A number of systems for displaying information on a flat screen are already known, but they all present various disadvantages which limit their application.

The systems presently available on the market are of several different types:

1. Active Systems (a) The electroluminescent systems based on the excitation of a phosphor by an electric field. These systems are active, i.e., they emit their own light and consequently must be observed under reduced ambient lighting conditions. Their duration, moreover, is limited, due to the phenomena of hysteresis appearing in the material used. e.g., U.S. Pat. No. 2,847,602 to Michlin; U.S. Pat. No. 3,631,285 to Laisi, et al.; U.S. Pat. No. 3,909,825 to Coleman, et al.

(b) The mosaics or arrays of electro-luminescent light emitting diodes (LED) based on the stimulated emission of semi-conducting junctions under the influence of an electric current. These are also active systems generating their own light. They consist of panels or frames composed of discrete elements, i.e., of distinct punctual elements. The minimum dimension of these elements is too large to allow high resolution. The possible colors, moreover, are limited to red and green. e.g. U.S. Pat. Nos. 3,827,048 and 3,840,858 to Usui; U.S. Pat. No. 3,911,430 to Jankowski, et al.; U.S. Pat. No. 3,911,431 to Katsumura, et al.

(c) The plasma systems based on local electric discharges in a suitable gas. They are active systems emitting their own light, and therefore observable in reduced lighting only. Nor does the electric discharge make possible the obtainment of a very high resolution.

2. Passive Systems (d) The liquid crystals based on the selective diffusion of light by the crystalline domains which are oriented in an electric field. These are passive systems diffusing light in proportion to the electric tension, i.e., voltage, applied. Their disadvantage resides in the fact that the selective diffusion of the light does not permit the realization of sufficient contrast. They also are subject to slow response time and very limited duration due to the slow oxidation of the materials used. e.g., U.S. Pat. No. 3,903,519 to Zega.

(e) The magneto-optic systems based on the displacement of opaque magnetic substances in a transparent background under the influence of local magnetic fields. They are also systems that do not lend themselves to a very high resolution because of the method of scanning. They present, moreover, a great inertia in relation to the electric systems.

The passive systems are generally preferable to the active systems since they can be viewed under high ambient light conditions.

These active and passive solid state display devices are generally intended as a substitute or replacement for cathode ray tubes which, while capable of presenting highly constrasting visual images with high speed, are subject to the defects of high cost, high voltage requirements and large size. This latter defect is particularly disadvantageous in view of the present trend towards miniaturization.

One particular type of cathode ray tube, known as a "skiatron" or dark trace tube employs a screen having a thin coating of a crystal material, e.g., an alkali halide, which forms color centers upon bombardment with an electron beam and many patents have been issued over the years directed to dark trace cathode ray tubes, e.g., U.S. Pat. No. 2,432,908 to Tevereny; U.S. Pat. No. 3,447,020 to Seats; and U.S. Pat. No. 3,548,236 to Kiss.

A color center information storage and retrieval system using hydrogenated alkali halide crystals is described by Knapp in U.S. Pat. No. 3,440,621.

A general discussion on color centers can be found in most texts on solid-state physics. For general brief discussion of color centers see, for example, *Introduction To Solid State Physics*, 3rd Ed. C. Kittel, John Wiley & Sons, Inc., New York (1967), pages 571-575.

However, while possessing many advantages the dark trace cathode ray tubes are slow (time on display: several milliseconds; erasing time: 1 minute) and cumbersome (volume of the tube is high). Moreover, these devices require the application of heat to erase the previous image. This is a great drawback with respect to erasure time and cooling time.

SUMMARY OF THE INVENTION

Accordingly, the present invention provides a process by which the various defects of the prior art dark trace tubes and flat active and passive "solid state" display devices can be avoided and a flat passive system color center display device to be used in such process. The system of the present invention is capable of high resolution and contrast comparable to a television image.

Generally, the process of the present invention includes applying an electric field in a first direction to a colorless (transparent) or substantially colorless or light colored crystal layer having structural defects, hereinafter often referred to as an "image screen", to form color centers, and thereafter applying an electric field in the opposite direction to erase or suppress the color centers.

In the solid state display device of the present application a tunnel junction type of electric current source and the image screen are formed in direct contact with each other. The tunnel junction type of electric current source is a conventional metal layer-insulation barrier-metal layer structure wherein the insulation barrier is made sufficiently thin such that the conduction band electrons from the first metal layer which impinge upon or are caused to impinge upon the barrier have a finite and significant probability of passing to the second metal layer. This is referred to as the "tunnel effect" or "tunneling" and the electrons which pass through the insulation barrier are referred to as "tunnel electrons". Moreover, according to the present invention the second metal layer is made very thin such that its thickness is less than the mean free path of any electron having sufficient energy to traverse the insulation barrier.

The image screen is a thin layer of a crystal material such as alkali halides or various metal oxides which form color centers, e.g., F centers, by the local application of an electric field. The color centers are viewed by reflection or absorption of colored light in the known manner.

By careful selection of an electrode array it is possible to selectively activate color centers at preselected areas corresponding to the particular information to be displayed. For example, by using a seven-segment figure-eight electrode array it is possible to display the alpha-numerics 0, 1, 2, 3, 4, 5, 6, 7, 8 and 9. Similarly, by providing a first set of parallel electrodes attached to the image screen and a second set of parallel electrodes, which are perpendicular to the first set of parallel electrodes, attached to or in place of the first metal layer of the electric current source it is possible, according to the present invention using conventional addressing systems, to form color centers at selected points corresponding to the intersection or cross-over points of the electrode grid.

In operation, an electric tension, i.e., voltage is applied across the metal layers of the tunnel junction electron injector whereby the tunnel electrons cross the insulation barrier and very thin metal layer and are trapped or caught by the defects in the crystal material forming the image screen to thereby form color centers. Simultaneously, a voltage is applied across the very thin metal layer and selected of the electrodes attached to the surface of the image screen opposite the very thin metal layer. This second voltage functions to accelerate the electrons entering the image screen towards preselected areas whereby there will only be formation of color centers in those areas associated with the activated electrodes.

The present invention will now be described by the following detailed description and the accompanying drawings.

BRIEF DESCRIPTION OF THE DRAWINGS

FIG. 7A illustrates the signal required for a conventional solid state display device based upon electroluminescent diodes while

FIG. 9 is a schematic illustration of a gate used in the embodiment of FIG. 10;

FIG. 10 is a block diagram of an addressing system for the solid state display device of the present application utilizing the electrode array of FIG. 6.

DETAILED DESCRIPTION OF THE INVENTION

Figure 1:
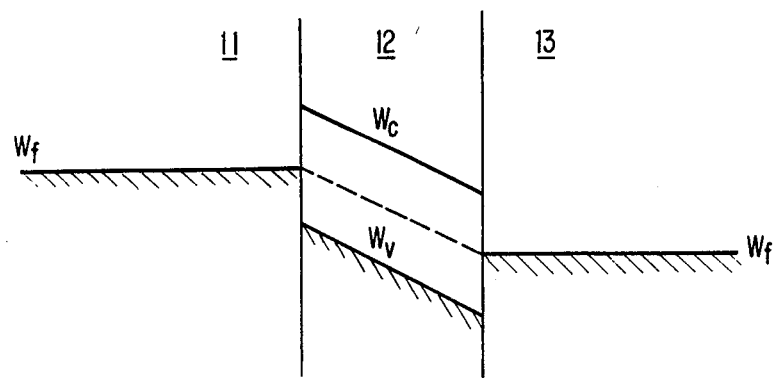
FIG. 1 is a simplified energy diagram through the respective layers of the tunnel junction used in the solid display device of the present application.

The process of the present invention requires the formation of "color centers". A color center is a lattice defect in a crystal structure which absorbs visible light thereby producing a local coloration from an otherwise normally colorless or a light or clear colored background. Color centers are most generally associated with alkali halides such as the lithium, sodium, potassium, rubidium or cesium salts of fluorine, chlorine and bromine, but are also found in alkaline earth metal halides such as magnesium and calcium halides. Color centers are also produced in various metal oxides and particularly the oxides of zinc, titanium, vanadium, tin, aluminum, indium, manganese, antimony, bismuth, molybdenum, tungsten, tantalum, etc. The preferred color center generating materials for the image screen of the present invention include various halides such as NaCl, KCl, $MgF_2$, LiF, $CaF_2$ and $PbCl_2$ and various metal oxides such as $CeO_2$, $TiO_2$, $Ta_2O_5$, BaO, SrO, ZnO, $MoO_3$, $SnO_2$, $WO_3$, $NiO_2$, MgO, $SrTiO_3$, $WO_3 \cdot TiO_2$, $MoO_3 \cdot TiO_2$, etc.

The most usual color center is given the name F center which, as explained in FIG. 10 on page 573 of the Kittel text, is a negative ion vacancy with one excess electron bound at the vacancy with the distribution of the excess electron predominately on the positive metal ions adjacent to the vacant lattice site. The F center is a trapped-electron center. It is also possible to form trapped-hole centers such as the $V_k$ center.

As is apparent from the above the formation of color centers is due to the trapping of charged carriers, i.e. electrons or holes, in ionic solids, made possible by the presence of defects in the crystal structure of the ionic solid. The electrons caught or trapped or the positive holes created by the extraction of electrons at the color centers are localized around the defects and occupy a characteristic level of energy which is intermediate between the fundamental state of the perfect crystal and the conduction band of the crystal. The electrons or holes thus trapped evolve on orbitals determined by the electronic structure of the defect. The energy of the light required to excite these charge carriers will necessarily be less than the width of the forbidden band. Light sources having the required energy $h\nu$ correspond most often to frequencies $\nu$ in the visible range. Therefore, light absorption of the color centers produces a strong localized coloration at the site of the defect.

As is well known in the art the formation of color centers requires first the creation of atomic defects and then the trapping of electrons or holes by the defects so formed. While the trapping may occur at the time of the formation of the defects this mode is not suitable for the solid state display devices of the present application. Rather, according to the present application, the trapping of electrons or of holes occurs by the injection of electrons in the crystal layer. According to the visualization technique of the present invention a sensitive layer image screen formed of a crystal material possessing a great number of defects uniformly spread throughout its volume is utilized in combination with means for locally injecting electrons to form color centers by means of their being trapped around the defects. Therefore, the present invention provides for the creation and the suppression of color centers with a local application of an electric field, the direction of which determines the operation. More specifically, the application of the electric field in one direction causes the color centers to appear and its application in the opposite direction makes them disappear. The mechanism of erasing the color centers by Schottky effect with a reverse voltage, i.e., the application of a sufficient electric tension for detaching the trapped electrons or holes from the defects at which they are trapped to cause the color centers to disappear, is one of the critical features of the solid state display devices and method for producing visual information displays in accordance with the present application.

The formation of the structural defects in the crystal material which can be utilized in the solid state display devices of the present invention can be formed by any of the standard methods. Typical of these methods include the following:

(a) Heating the crystal in the presence of an excess of one of the constituents of the crystalline mesh. The atoms of this constituent are introduced by diffusion into interstitial positions were they produce the desired defects.

(b) Plastic deformation of the solid under the effect of mechanical tension to produce displacement of the constituents of the mesh with the formation of punctual or point defects.

(c) Irradiation by rapid particles (X-ray, gamma-ray, neutron and electron bombardment) to directly displace the constituent ions of the solid material by direct shock or impact. This technique produces two types of defects, one in which a gap or hole is formed by the departure of the displaced ion and the other due to the presence of the displaced ion at an interstitial position in the crystalline lattice.

(d) Doping, i.e., the introduction into the crystalline lattice of atoms of foreign materials which become fixed at interstitial positions or replace ions belonging to the original crystalline lattice.

The most preferred methods for the formation of the structural defects are method (c) irradiation and method (d) doping. Moreover, doping techniques are well known in semi-conductor technology and are most preferred for use in the formation of the sensitive layers of the present application.

As previously mentioned, it is possible using the above-mentioned techniques for the formation of structural defects that the techniques themselves will provide the electrons which will be trapped for the creation of the color centers. However, care should be taken to avoid this result and such techniques are well available to the skilled practitioner. In accordance with the present invention the sensitive layer is used in conjunction with a means for conveying the electrons which will be trapped by the structural defects in the crystalline lattice of the sensitive layer to form the color centers. The electrons are conveyed by an electric signal that transfers the information to be displayed.

According to the present invention the means for conveying the electric signal providing the electrons for forming the color centers incorporates a selective system of electron injection by tunnel effect. Such devices are, by themselves, well known in the prior art and include a metallic layer, a thin insulating barrier layer and a second very thin metallic layer forming a composite similar to a semi-conductor junction. The use of such carrier (hole or electron) selective injection across a tunnel junction by tunnel effect in association with a sensitive layer in which color centers can be formed is another of the essential features which characterize the solid state display device and information display method according to the present application.

Figure 2:
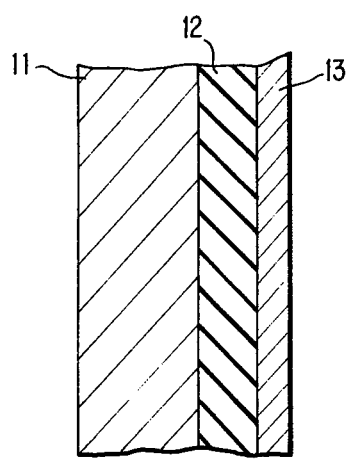
FIG. 2 is a cross-sectional view of the layers of the tunnel junction.

In order to obtain a better understanding of the functioning of the tunnel junction device used in the present invention reference is made to FIGS. 1 and 2. When a voltage is applied between the two metallic layers 11 and 13, the electrons in the vicinity of the Fermi level $Wf$ in the metal 11, brought to a negative potential, can penetrate by tunnel effect into the forbidden zone above the valence band, $W_v$ of insulation barrier 12 as far as and beyond its conduction band $W_c$ and on the other side of the barrier reach the metal layer 13, which is brought to a positive potential. Metal layer 13 has a thickness which is less than the average mean free path of an electron, so that the electrons coming from layer 11 and traversing the insulation barrier layer 12 by tunnel effect will be able, if they has a sufficient energy to overcome the resistance issuing from the metal layer 13, to be emitted by the surface of the latter. This tunnel junction electron injection structure can thus be utilized for the injection of electrons in the transparent or light colored sensitive layer image screen which accepts these electrons at a determined energy level to form color centers.

Figure 3:
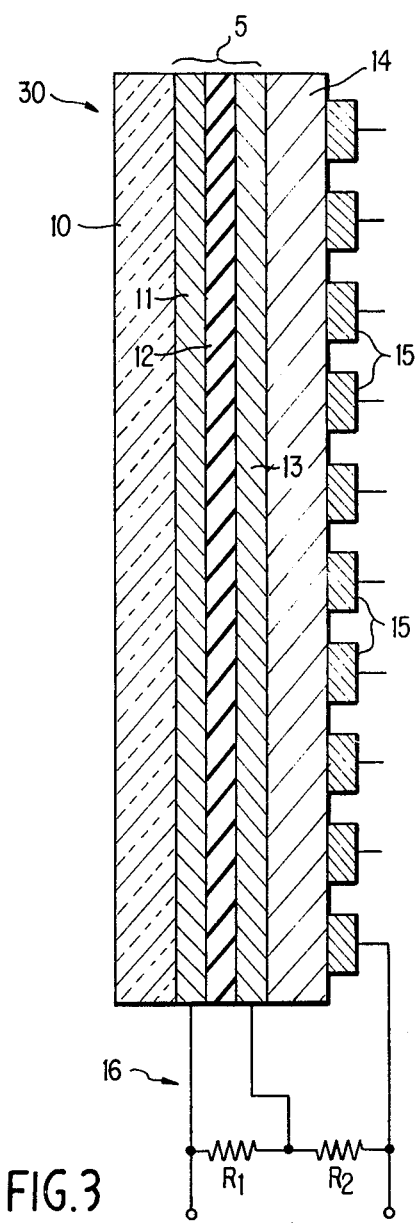
FIG. 3 is a schematic cross-sectional view of one embodiment of the solid state display device of the present application.

The complete structure of the solid state display flat screen according to the present invention is shown diagrammatically in FIG. 3. The flat screen 30 includes transparent support 10 on which have been placed in succession the tunnel junction electron injector 5 including metallic layer 11, insulating barrier layer 12, and thin metallic layer 13, image screen 14 which is a layer of chromophoric, i.e., generative of color centers, material and a system or array of metallic electrodes 15 spread over the surface of screen 14 in any suitable layout, such as parallel bands.

The application of a voltage $V_1$, between metal layers 11 and 13, and of a voltage $V_2$, between metal layer 13 and electrodes 15, using any conventional wiring circuit such as shown at 16 which can be used for selectively activating any desired one or more of the electrode segments of array 15 makes possible on the one hand the interjection of electrons by the tunnel junction structure 5 into the crystals of the chromogenic material forming image screen 14 and on the other, the acceleration of these electrons in the sensitive layer towards the activated electrodes of array 15, so that substantially all of the electrons will be trapped by the structural defects in the crystals forming the sensitive chromogenic layer (image screen 14) to thereby form color centers at predetermined sites corresponding to the desired information.

Figure 4:
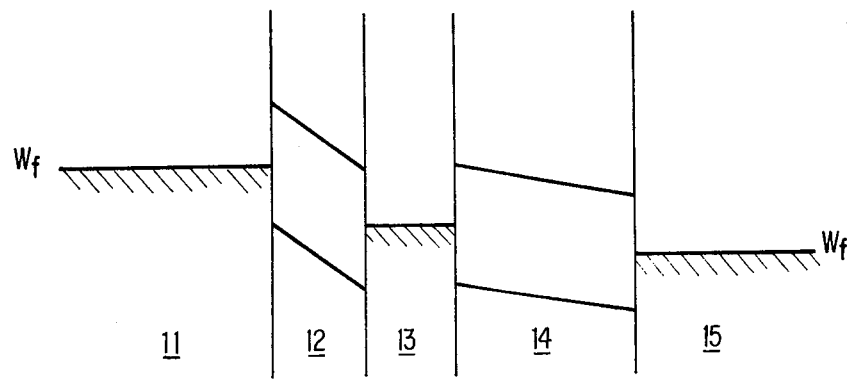
FIG. 4 is a simplified energy diagram across the respective layers of the solid state device of FIG. 3.

The corresponding energy diagram for FIG. 3 is illustrated by FIG. 4, in which the reference marks have the same significance as for FIG. 1, $Wf$ designating the energy of the Fermi level of the transmitting metal layer 11.

Figure 5:
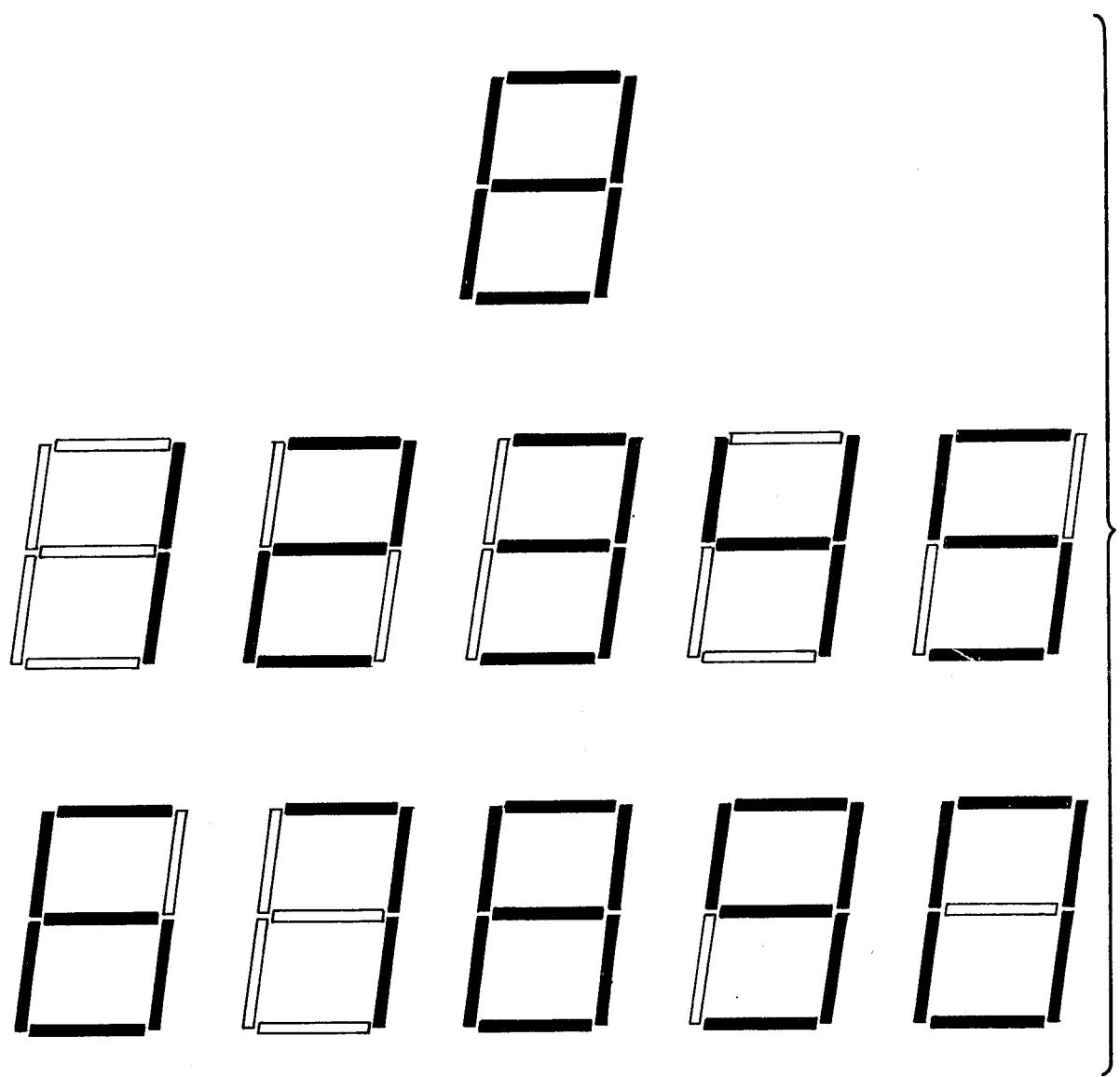
FIG. 5 is an illustration of one embodiment of the electrode array which can be used in the solid state display devices of the present application.

According to one embodiment the array of electrodes 15 can be built of segments such as shown in FIG. 5 which make possible, by a selective commutation, the formation of alphanumerical characters as illustrated in FIG. 5.

Figure 6:
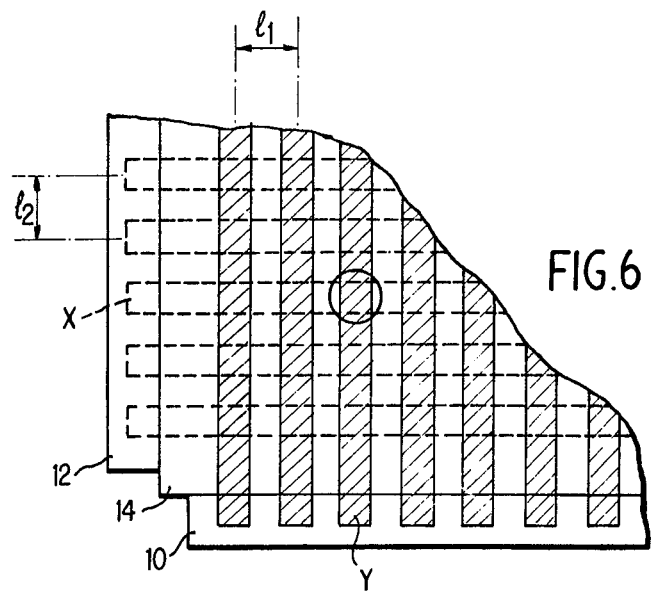
FIG. 6 illustrates another embodiment of the electrode array for the solid state display device.

In a preferred embodiment as shown in FIG. 6 the metallic layer 11 can also be discontinuous and formed of parallel metallic bands X which, with an identical distribution of perpendicular electrodes Y in parallel electrode array 15, will form a grid X-Y, making possible the excitation of a point (shown by the circle) in the sensitive layer 14 by the application of signals on two selected electrodes X and Y. The programmed distribution of the activation signals on the entirety of the horizontal electrodes X and of the vertical electrodes Y, with the aid of the appropriate circuits, makes it possible to realize a complete scanning or sweeping of the surface of the image screen 14. Good results are obtained with a spacing between the electrodes of about 10 microns. This construction is readily obtained with current technology according to well known means. It is possible for example, to have a crossbar arrangement with a line density of 50/mm or more using conventional integrated circuit technology.

The preparation of the different elements of the structure according to the present invention can be achieved in the following manner, again using currently available and well understood technology:

(a) Support 10. The support must be transparent and sufficiently rigid to be manipulated easily without the danger of folding or bending, as this would adversely effect the various sensitive layers of the structure. Suitable materials would be glass or plastic substances, but glass is preferable. The thickness may vary from 0.5 mm or less to about 5 mm. The other dimensions are not important and can easily be adapted to the particular application and requirements of the solid state display device.

(b) Transmitting layer 11. This layer will have to be sufficiently transparent to make possible the observation of the variations of optical density in the sensitive chromophoric material of image screen 14. This involves thicknesses that may vary from 100 to 3000 Angstroms with transmissions of from 0.1 to 85%. The material of this layer will be a metal such as silver, gold, nickel, tin, antimony, bismuth, aluminum, cadmium, chromium, palladium, or an oxide conductor, such as stannic oxide or indium oxide. The choice of the material depends on that of the materials of the following layers, 12, 13, 14 and 15, according to the disposition of the Fermi levels in the energy diagram of FIG. 4. Several preferred but non-exhaustive possible combinations of materials making up the structure of the several contiguous layers of the solid display system according to the present invention are indicated in Table 1 below:

TABLE I

| LAYER 11 | | LAYER 12 | | LAYER 13 | | LAYER 14 | | LAYER 15 | |
|---|---|---|---|---|---|---|---|---|---|
| Material | Thickness (A) | Material | Thickness (A) | Material | Thickness (A) | Material | Thickness (A) | Material | Thickness (A) |
| Sb | 3000 | $Sb_2O_3$ | 50 | Zn | 10 | NaCl | $10^5$ | Al | 600 |
| Sb | 3000 | $Sb_2O_3$ | 50 | Zn | 10 | KCl | $10^4$ | Al | 600 |
| Bi | 2000 | $Bi_2O_3$ | 50 | Zn | 20 | NaCl | $10^3$ | Al | 600 |
| Bi | 2000 | $Bi_2O_3$ | 50 | Zn | 20 | KCl | $10^3$ | Al | 600 |
| Sb | 3000 | $Sb_2O_3$ | 100 | Zn | 20 | $MgF_2$ | $10^4$ | Al | 600 |
| Sb | 3000 | $Sb_2O_3$ | 100 | Zn | 10 | LiF | $10^4$ | Al | 600 |
| Bi | 2000 | $Bi_2O_3$ | 200 | Zn | 50 | $CaF_2$ | $10^3$ | Al | 600 |
| Ni | 200 | $MoO_3$ | 100 | Zn | 20 | $CeO_2$ | $10^3$ | Al | 600 |
| Al | 200 | $Al_2O_3$ | 200 | Ta | 20 | $TiO_2$ | $10^3$ | Be | 1000 |
| Al | 200 | $Al_2O_3$ | 50 | Ta | 10 | $Ta_2O_5$ | $10^2$ | Be | 1000 |
| Sb | 3000 | $Sb_2O_3$ | 50 | Zn | 10 | BaO | $10^2$ | Be | 1000 |
| Ni | 200 | $SiO_2$ | 50 | Zn | 10 | SrO | $10^2$ | Al | 600 |
| Sn | 3000 | $SnO_2$ | 50 | Pb | 10 | $PbCl_2$ | $10^3$ | Mg | 1000 |
| Au | 100 | $SiO_2$ | 100 | Zn | 20 | ZnO | $10^2$ | Be | 1000 |
| Au | 100 | $SiO_2$ | 200 | Mo | 50 | $MoO_3$ | $10^2$ | Sn | 3000 |
| Ni | 200 | $SiO_2$ | 100 | Sn | 20 | $SnO_2$ | $10^3$ | Mo | 3000 |
| Au | 100 | $SiO_2$ | 200 | W | 20 | $WO_3$ | $10^3$ | Sn | 3000 |
| Sb | 3000 | $Sb_2O_3$ | 200 | Ni | 20 | $NiO_2$ | $10^3$ | Au | 1000 |
| Al | 200 | $Al_2O_3$ | 100 | Mg | 20 | MgO | $10^3$ | Si | 3000 |
| Pd | 100 | $SiO_2$ | 50 | Ni | 10 | $SrTiO_3$ | $10^3$ | Au | 1000 |
| Au | 100 | $SiO_2$ | 50 | W | 10 | $WO_3/TiO_2$ | $10^2$ | Sn | 3000 |
| Au | 100 | $SiO_2$ | 100 | Mo | 20 | $MoO_3/TiO_2$ | $10^2$ | Sn | 3000 |

Depending on the metal or the oxide used, one may employ different methods for the formation of the layer. The chief methods include, for example:

(1) Thermal evaporation in a vacuum, where the metal is heated in a refractory crucible with regard to the formation support of the layer until the sublimation of the metal, which is then plated out on the support 10 as layer 11.

(2) Cathode sputtering, which consists of carrying out an electric charge to a suitable gas while utilizing a cathode of the metal to be deposited. The support 10 placed close to this cathode receives the pulverized metal forming the required layer 11.

(3) Deposit by chemical reduction which consists of immersing the support in a solution containing a reducing agent and a metallic salt of the metal of which one is endeavoring to form the layer 11.

These familiar methods do not require any additional explanation. The preferred method is that of thermal evaporation in a vacuum, which is more flexible and controllable than the others.

(c) Insulation barrier layer 12. As has already been indicated, this layer makes possible the passage of the electrons in the vicinity of the Fermi level in the metal layer 11, by tunnel effect, across the forbidden band as far as the conduction band and beyond toward the metal layer 13. The transfer conditions by tunnel effect require a very homogeneous layer as well as a critical thickness depending on the insulating material and the voltage applied. This thickness will vary according to the materials used, but is generally from 10 to 200 A. The insulating materials suitable for the process are generally oxides, such as aluminum oxides, antimony oxide, and bismuth oxide, silica, silicon monoxide, molybdenum oxide, etc. The suitable method for the formation of the insulating layer 12 depends on the choice of the oxide and of the subjacent metal 11. The following may be considered:

(1) Thermal evaporation in a vacuum according to a process identical with the one indicated for layer 11. Ex: $SiO_2$, SiO.

(2) Thermal oxidation, preferably applicable when the oxide is that of the metal of layer 11. The method consists of heating in air both support 10 and layer 11 at a temperature sufficient for the oxidizing of layer 11. The duration of the process will determine the thickness of the layer. Ex: $Sb_2O_3$, $Bi_2O_3$.

(3) Electrolytic oxidation, applicable also when the oxide is that of the metal of layer 11. The method consists of an electrolytic treatment where the layer of metal 11 is used as an anode. The duration of the process also determines the thickness of the oxide layer formed. Ex: $Al_2O_3$.

(d) Second metallic layer 13. This second layer serves as an emission surface of the electrons for the sensitive chromogenic layer 14 of the generating material of color centers. Its thickness must be such that it is below the average mean free path of the electrons issuing from layer 12, which corresponds to thicknesses of the order of from 10 to 50 Angstroms. The metal of which this layer will be made may be gold, silver aluminum, antimony, bismuth, nickel, tungsten, magnesium, cadmium, tantalum, lead, molybdenum, chrome, tin, indium, etc. The preferred metals are shown in Table 1. The choice of the metal depends, as in the case of the other layers, on the materials used for the latter, and one may refer to Table 1 for the selection of this material. The methods to be used for the formation of this second metallic layer 13 are either thermal evaporation in a vacuum or the method of cathode sputtering. These two methods have been described in connection with the formation of layer 11.

(e) Sensitive chromogenic layer 14. There are two classes of materials applicable for the image screen of the flat screen solid state display device according to the present invention:

(1) The metal halides, such as the chlorides, bromides, fluorides of sodium, potassium, lithium, magnesium, calcium, lead, etc. Preferred halides are shown in Table 1.

(2) Certain metallic oxides, such as the oxides and mixed oxides of zinc, titanium, vanadium, tin, aluminum, indium, manganese, cerium, nickel, antimony, bismuth, molybdenum, tungsten, tantalum, barium, strontium, magnesium, etc. Preferred oxides are shown in Table 1.

These layers are preferably obtained by thermal evaporation in a vacuum for the alkali halides and by evaporation in a vacuum or cathode sputtering for the metallic oxides. The choice of the material will also depend on that of the other constituents, and one may refer to Table 1 above for suitable combinations. The layer must be sufficiently thick to permit the formation of a good optical density and sufficiently thin to preserve a good resolution. The optimal values have been found to be from 0.01 to 10 $\mu$ for the metal halides and from 0.01 to 0.1 $\mu$ for the metallic oxides. The doping or dopage of the layers can and must be effected during their preparation, either in the course of the evaporation by providing a second crucible at a lower temperature, containing the dopant, or directly afterwards by evaporating a thin layer of the dopant on the surface of layer 14, followed by a thermal treatment of the whole, making possible the diffusion of the dopant into layer 14. The dopant should be present uniformly dispersed throughout the image screen and in sufficient quantity to present good optical contrast by the formation of color centers.

(f) The control electrodes 15. These electrodes will be distributed over the surface of layer 14 in such a way as to concentrate the trajectories of the electrons in the interior of image screen 14 for the formation of color centers at the sites selected for the display. The material for the electrode can be any suitable metal used for this purpose in integrated circuit technology. Preferred metals are shown in Table 1. These electrodes can be arranged in the form of seven-segments as shown in FIG. 5, each segment being connected separately with the selection control circuit. The upper part of FIG. 5 represents the effect produced if one activates the entirety of the segments, and the two lower lines illustrate a selective activation corresponding to the formation of the alpha-numeric characters.

This activation can also be made with the aid of decoding circuits similar to those which are used for the activation of the electroluminescent diodes. These conventional circuits need merely be adapted according to standard techniques in order to account for the difference in behavior between the electro-luminescent diodes and the color centers according to the present invention. In effect, the former requires the maintenance of a continuous current in order to carry on the activation of the display; the latter, on the contrary, require only a very brief signal for the formation of the color centers and a second for their obliteration.

Figure 7A:
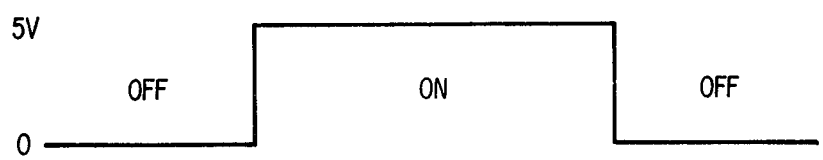
Figure 7B:
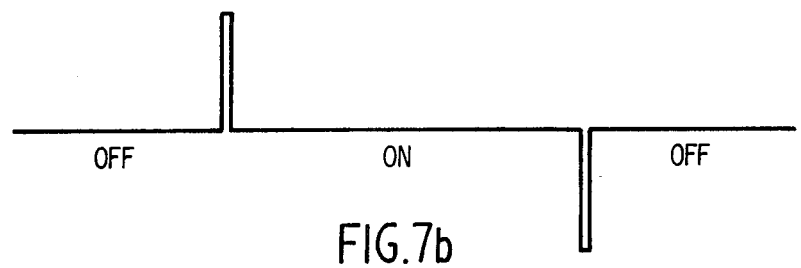
FIG. 7B shows the signal for the flat screen display device of the present application utilizing color centers.
Figure 8:
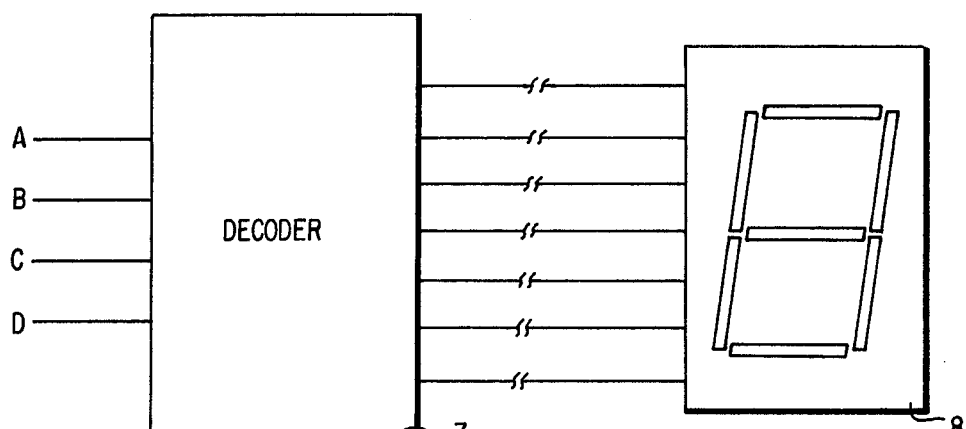
FIG. 8 is a schematic illustration in block form of one embodiment of a display system utilizing the solid state display device of the present application.

This is illustrated by FIGS. 7a and 7b: the signal necessary for the lighting of electroluminescent diodes is shown by FIG. 7a, whereas the signal of FIG. 7b applies to a system of visualization with color centers. It will be seen that it suffices to send positive impulses for the activation of the display and negative impulses for their erasure. This can be obtained simply, for example, by inserting suitable capacities between the outlets of a binary decoder 17 (such as the integrated circuit SN 7447 A of the TEXAS INSTRUMENTS CO.) and the inlets of the display device 18, as shown diagrammatically in FIG. 8.

The seven-segment figure-eight electrode array and techniques and devices for their selective activation are well known in the art for various of the different active and passive solid state display devices of the prior art. In addition to the above-mentioned patents reference can also be made to the following representative patents: U.S. Pat No. 3,792,308 to Ota; U.S. Pat. No. 3,912,368 to Ponjee, et al.

The fact that the image imparted by the application of voltage across the device will remain indefinitely until a reverse voltage is applied, makes the solid state display device of the present invention very useful as a memory device for storage of information.

These control or posting electrodes can also be arranged in the form of parallel bands in association with a similar structure of metallic layer 11, but arranged perpendicularly thereto. This system, which forms a grid and is known under the term "crossbar", is shown in FIG. 6. It is seen that the selection of an electrode X of layer 11 and an electrode Y of layer 15 determines the formation of color centers at the point of intersection of these electrodes. The organization of these points makes it possible to display at will alpha-numeric characters, delineations, and eventually, if technology achieves this resolution, images of the television type.

The selective activation of the crossbar electrodes can be carried out with a commutation ensemble such as shown in FIG. 10. Each line and each column of the crossbar is connected with a gate represented by the symbol shown in FIG. 9, according to known methods, particularly by means of gates connected to each line and to each column of the crossbar.

Such gates are well known in metal oxide semiconductor, MOS, technology, e.g., an integrated circuit comprising eight of these gates in one box is formed for the circuit MC 14529 of Motorola (8-Channel Analog Data Selector), and each circuit can be connected with eight lines or eight columns.

The functioning principle of such a gate as illustrated by FIG. 9 is as follows: complementary logical levels are applied on entries G1 and G2. When G1 is at the logical level 0 and G2 at the logical level 1, gate is essentially open, i.e., it presents a slight impedance; conversely, when G1 is at the logical level 1 (and G2 at the level 0), it is blocking, i.e., it presents a very high impedance.

Each gate is selected by a suitable combination of logical levels on the addressing entries.

The commutation ensemble includes the following elements, illustrated in FIG. 10.

A clock 20, synchronized by the synchronization impulses furnished by a video signal 21, delivers a frequency signal corresponding to the commutation frequency of the columns of the crossbar.

A meter 22 makes it possible to divide this frequency in order to obtain from it a frequency signal corresponding to the commutation frequency of the lines, the commutation frequency of the lines being equal to the commutation frequency of the columns divided by the number of columns.

Logical addressing systems for the columns 23 and rows 24 make it possible to release or free successively, at each impulse, each gate of the corresponding selectors 25 and 26.

The information inscribed on each point of the crossbar remains "stocked" as long as it is not erased. Before a new information is inscribed, it becomes necessary to obliterate the preceding information by applying a sign impulse opposite to the sign of the inscription impulse. This impulse is provided by a monostable 27, e.g., flip flop, released by the impulses of clock 20.

Similar crossbar systems have been used with other types of image display devices. The Ota patent referred to above is one and U.S. Pat. No. 3,743,773 to Sobel is another. This latter publication uses a device similar to that shown in FIG. 10 and reference can be made to this patent for further information.

The invention will now be illustrated by the following examples. It is to be understood, however, that such examples are for purposes of illustration only and the present invention is in no way to be deemed as limited thereto.

EXAMPLE I

On a small plate of Nesa glass, a layer of antimony having a thickness of 3000 Angstroms is evaporated in a vacuum. The plate is then removed from the vacuum and introduced into a furnace where it is brought in free air to a temperature of 300° C for a period of 10 minutes. The preparation is then reintroduced in the vacuum, where a new metallic layer, of zinc and with a thickness of 10 Angstroms is evaporated, then on top of this layer a layer of sodium chloride having a thickness of $10\mu$, and finally, through a suitable mask, some segments of aluminum electrode with a thickness of 600 Angstroms. Contacts are carried out using silver paste (Eccocoat) on the Nesa glass, the second metallic layer and each of the segments of electrodes. The different contacts are joined to a driving circuit, as indicated on FIG. 3. The application of a voltage of 2 volts between the points A and B makes it possible to obtain a blackening of the region corresponding to the segment on which the voltage is applied. The application of a reverse voltage of 5 volts causes the obliteration of the information.

EXAMPLE II

On a small plate of Nesa glass a layer of bismuth with a thickness of 2000 Angstroms is evaporated in a vacuum. The plate is then removed from the vacuum and introduced into a furnace where it is brought in free air to a temperature of 350° C during 10 minutes. The preparation is then reintroduced in the vacuum where one effects by means of cathodic pulverization in a suitable gas the deposit of a zinc layer having a thickness of 10 Angstroms. Then, after having evacuated the space, one evaporates a layer of potassium chloride with a thickness of 1 $\mu$ and finally, through a suitable mask, one again evaporates some segments of electrodes in aluminum having a thickness of 600 Angstroms. The different contacts will be effected as in the case of the preceding example. The activation of the display is effected with 4 volts and the obliteration with 6 volts.

EXAMPLE III

This example corresponds to an arrangement of the elements inverse to that used for the proceding examples.

On a small plate of Nesa glass one forms, by cathodic pulverization in a suitable enclosure, a layer of tungsten oxide $WO_3$, having a thickness of $10^3$ Angstroms. On top of this layer one evaporates in a vacuum a tungsten layer with a thickness of 20 Angstroms, then a layer of $SiO_2$ with a thickness of 200 Angstroms, and finally through a suitable mask some segments of electrodes with a thickness of 100 Angstroms. The different contacts will be effected as in the case of Example 1, but attention is called to the fact that in this example it is the Nesa glass which is negative for the activation and positive for the obliteration. The display is effected under a voltage of 5 volts and the obliteration with 12 volts.

EXAMPLE IV

On a small plate of Nesa glass one brings about by means of cathodic pulverization in a suitable gas the deposit of a layer of palladium Pd with a thickness of 100 Angstroms; on top of this layer one evaporates in a vacuum a layer of $SiO_2$ with a thickness of 50 Angstroms, then a layer of nickel with a thickness of 10 Angstroms, then a layer of titanate of strontium $SrTiO_3$ with a thickness of $10^3$ Angstroms, and finally, through a suitable mask, one will form some segments of electrodes in Au, with a thickness of 1000 Angstroms. The different contacts will be effected as in Example I, and one will have for the display 7 volts and for the obliteration 12 volts.

EXAMPLE V

On a small plate of Nesa glass a layer of aluminum (thickness: 200 Angstroms) will be evaporated in a vacuum. One then introduces this plate in a bath of anodic oxidation in which one develops, on the surface of the aluminum layer, an oxide layer of thickness 200 Angstroms. After having withdrawn the plate from the bath and dried it, one will deposit on top of the oxide layer a tantalum layer of 20 Angstroms thickness by cathodic pulverization in a suitable gas, then by cathodic pulverization or evaporation in a vacuum a layer of $TiO_2$ (thickness: 10³ Angstroms), and finally, through appropriate masks one will deposit, by evaporation in a vacuum, segments of electrodes in beryllium (thickness: 1000 Angstroms). The different contacts will be effected as in Example I, and for the display activation one will have 4 volts and for the obliteration 7 volts.

While various embodiments of the present invention have been illustrated by way of specific examples, it is to be understood that the present invention is in no way to be deemed as limited thereto but should be construed as broadly as all or any equivalents thereof.

I claim:

1. A flat screen for a solid state passive display system comprising, in order, the following layers:
   a transparent support,
   a tunnel junction electron injector including
      a first metal layer of a metal capable of emitting electrons,
      an insulation barrier layer having a thickness through which electrons can pass by tunnel effect, and
      a second metal layer having a thickness less than the average mean free path of an electron passing by tunnel effect from the first metal layer through the insulation barrier,
   an image screen consisting of a sensitive layer of a chromogenic material capable of generating color centers upon injection of charge carriers, and
   an electrode array for selective formation of color centers in said sensitive layer.

2. The flat screen of claim 1 which further includes means for applying a voltage between said first and second metal layers and between said second metal layer and said electrode array.

3. The flat screen of claim 1 wherein said first metal layer is formed from a metal selected from the group consisting of Al, Sb, Bi, Ni, Sn, Au and Pd and has a thickness in the range of from about 100 to 3000 Angstroms.

4. The flat screen of claim 1 wherein said insulation barrier layer is a metal oxide selected from the group consisting of $Al_2O_3$, $Sb_2O_3$, $Bi_2O_3$, $MoO_3$ and $SiO_2$ and has a thickness in the range of from between about 50 to 200 Angstroms.

5. The flat screen of claim 1 wherein the second metal layer is formed from a metal selected from the group consisting of Zn, Pb, Ta, Mo, Sn, W, Ni and Mg and has a thickness in the range of from about 10 Angstroms to about 50 Angstroms.

6. The flat screen of claim 1 wherein said sensitive layer is formed from a metal oxide or mixed metal oxide selected from the group consisting of $CeO_2$, $TiO_2$, $Ta_2O_5$, $BaO$, $SrO$, $ZnO$, $MoO_3$, $WO_3$, $NiO_2$, $MgO$, $SrTiO_3$, $WO_3.TiO_2$ and $MoO_3.TiO_2$ and has a thickness in the range of from about 100 to about 1000 Angstroms.

7. The flat screen of claim 1 wherein said sensitive layer is formed from a metal halide selected from the group consisting of NaCl, KCl, $MgF_2$, LiF, $CaF_2$ and $PbCl_2$ and has a thickness in the range of from about $10^2$ to about $10^5$ Angstroms.

8. The flat screen of claim 1 wherein the electrodes of said electrode array are formed from a metal selected from the group consisting of Al, Be, Mg, Sn, Au and Si and have a thickness in the range of from about 600 to about 3000 Angstroms.

9. The flat screen of claim 1 wherein said electrode array consists of distinct electrode segments which can be selectively activated for the display of alpha-numeric characters.

10. The flat screen of claim 1 wherein said first metal layer is in the form of a series of parallel bands and said electrode array is in the form of a series of parallel bands which are disposed perpendicularly to the parallel bands of said first metal layer.

11. A process for displaying information on the flat screen of claim 1 which comprises applying a voltage across said first and second metal layers and across said second metal layer and preselected of the electrodes of said electrode array, said voltage being sufficient to transport charge carriers from said second metal layer to said sensitive layer, said electrodes being selected in accordance with the image to be displayed, whereby color centers in the sensitive layer are formed only according to the image of the information to be displayed.

12. The process of claim 11 which further comprises applying a reverse voltage across said first and second metal layers and across said second metal layer and said electrode array whereby the color centers are obliterated and a new information can be displayed.

13. The flat screen of claim 1 wherein said first metal layer is formed from a metal selected from the group consisting of Al, Sb, Bi, Ni, Sn, Au and Pd and has a thickness in the range of from about 100 to 3000 Angstroms;
   said insulation barrier layer is a metal oxide selected from the group of $Al_2O_3$, $Sb_2O_3$, $Bi_2O_3$, $MoO_3$ and $SiO_2$ and has a thickness in the range of from between about 50 to 200 Angstroms;
   said second metal layer formed from the metal selected from the group consisting of Zn, Pb, Ta, Mo, Sn, W, Ni and Mg and has a thickness in the range of from about 10 Angstroms to about 50 Angstroms;
   said sensitive layer is formed from a metal oxide or mixed metal oxide selected from the group consisting of $CeO_2$, $TiO_2$, $BaO$, $SrO$, $ZnO$, $MoO_3$, $WO_3$, $NiO_2$, $MgO$, $SrTiO_3$, $WO_3.TiO_2$ and $MoO_3.TiO_2$ and has a thickness in the range of from about 100 to about 1000 Angstroms or from a metal halide selected from NaCl, KCl, $MgF_2$, LiF, $CaF_2$ and $PbCl_2$ and has a thickness in the range of from about $10^2$ to about $10^5$ Angstroms; and
   the electrodes of said electrode array are formed from a metal selected from the group consisting of Al, Be, Mg, Sn, Au and Si and have a thickness in the range of from about 600 to about 3000 Angstroms.

14. The flat screen of claim 13 which further includes means for applying a voltage between said first and second metal layers and between said second metal layer and said electrode array.

15. The flat screen of claim 13 wherein said electrode array consists of distinct electrode segments which can be selectively activated for the display of alpha-numeric characters.

16. The flat screen of claim 13 wherein said first metal layer is in the form of a series of parallel bands and said electrode array is in the form of a series of parallel bands which are disposed perpendicularly to the parallel bands of said first metal layer.

17. The process of claim 12 wherein the display voltage across at first and second metal layers and across said second metal layer and preselected of the electrodes of said electrode array is in the range of from 2 to 7 volts and the reverse voltage across said first and second metal layers and across said second metal layer and said electrode array is in the range of from 5 to 12 volts.

* * * * *